United States Patent [19]

Anderton

[11] Patent Number: 4,832,440
[45] Date of Patent: May 23, 1989

[54] OPTICAL FIBER CONNECTOR

[75] Inventor: John J. Anderton, Oil City, Pa.

[73] Assignee: GTE Products Corporation, Stamford, Conn.

[21] Appl. No.: 413,856

[22] Filed: Sep. 1, 1982

[51] Int. Cl.⁴ .......................... G02B 6/36; G02B 7/26
[52] U.S. Cl. ............................... 350/96.21; 350/96.20
[58] Field of Search ........................... 350/96.20, 96.21

[56] References Cited

U.S. PATENT DOCUMENTS 4,046,453 9/1977 Fiebelkorn et al. .............. 350/96.21
4,421,383 12/1983 Carlsen ............................. 350/96.20

Primary Examiner—William L. Sikes
Assistant Examiner—Robert E. Wise
Attorney, Agent, or Firm—Robert E. Walter

[57] ABSTRACT

In a connector for joining a pair of optical fibers in end-to-end relationship along a straight axis, a fiber receiving member is mounted in a cylindrical glass sleeve intermediate a pair of glass fiber guides which each have an orifice for guiding a respective fiber along the straight axis.

5 Claims, 1 Drawing Sheet

OPTICAL FIBER CONNECTOR

BACKGROUND OF INVENTION

This invention relates generally to optical fibers and more specifically to a connector therefore.

There are many advantages to transmitting light energy via optical fiber wave guides and the use thereof is diverse. Single or multiple fiber wave guides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

When placing optical fibers in end-to-end relationship to minimize light loss, it is desirable to have a rugged splice that can be simply and reliably used in field installations. The junctioned fibers should be protected from environmental factors and be securely held in place.

The following patents relate to various fiber optic connectors: U.S. Pat. No. 3,922,064 to Clark et al, U.S. Pat. No. 3,990,779 to McCartney, U.S. Pat. No. 4,050,783 to Tardy, U.S. Pat. No. 4,050,781 to Beauhairi, U.S. Pat. No. 4,097,129 to Wellington et al, and U.S. Pat. No. 4,146,299 to Wellington et al.

SUMMARY OF THE INVENTION

It is desirable to form an optical fiber connector of simple construction that can be easily assembled and provides an accurate interconnection between optical fibers.

In accordance with the present invention, there is provided a connector for joining a pair of optical fibers in end-to-end relationship along a straight axis comprising an elastomeric receiving member mounted in a cylindrical shaped glass sleeve intermediate a pair of fiber guides which are each mounted at a respective end of the sleeve. The fiber receiving member has an opening for expandably receiving an optical fiber dimensioned larger than the opening. Each guide is spaced from the receiving member and mounted in an open end of the sleeve. Each fiber guide includes a cylindrically shaped section and a conically shaped bulge at one end with a centrally aligned orifice extending there through.

DETAILED DESCRIPTION

Figure 1:
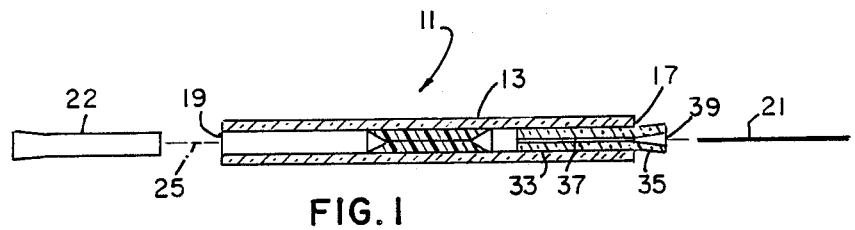
FIG. 1 is an exploded assembly view illustrating in section the various components of the connector.
Figure 2:
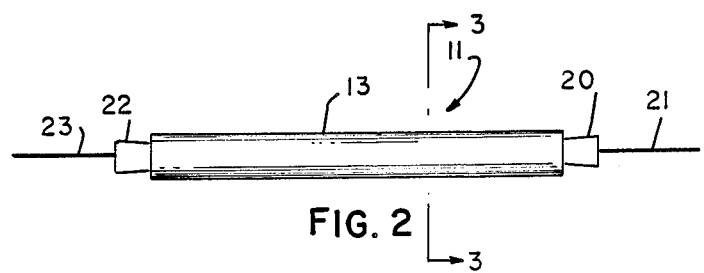
FIG. 2 is a side elevational view of the assembled connector.
Figure 3:
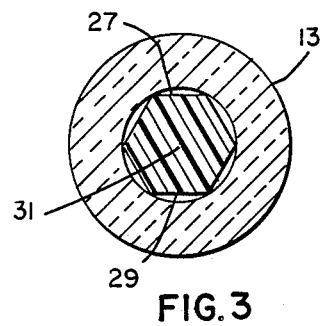
FIG. 3 is a sectional view along section 3—3 of FIG. 1.

As illustrated in the drawings, the fiber optic connector 11 comprises a glass cylindrically shaped sleeve 13 having a fiber receiving member 15 mounted therein intermediate the open ends 17,19 of the sleeve 13. A pair of fiber guides 20,22 are provided with each of the fiber guides 20,22 being mounted in one of the respective ends 17, 19.

The connector 11 joins a pair of fibers 21,23 along a straight axis 25 at the fiber receiving member 15 which may be a splice of the type illustrated and described in U.S. Pat. No. 4,257,674 to Griffin et al. The description of this patent is incorporated by reference into the specification of this application. In this case, the splice or receiving member includes a pair of opposite sections 27,29 having an axially aligned groove 31 extending there through for receiving fibers 21,23. The groove or opening 31 is dimensioned smaller than the fibers 21,23 taking to account the resilient properties of the elastomer. As the fibers 21,23 are inserted into the opening 31 the walls of the opening 31 tend to expand with elastic restoring forces tending to maintain the fibers in proper alignment. The opening is dimensioned so that the fiber insertion force is not so great as to cause breakage or undue bending of the fibers.

Each of the sections 27,29 have mating planar surfaces in engagement. One of the sections 27,29 includes a V-groove facing a planar surface of the other section so as to form a substantially triangular opening 31 in cross section when the sections 27,29 are mated. From a central fiber junctioning region, the opening 31 extends along a straight path substantially corresponding to the straight axis 25 to permit proper axial alignment of the fibers 21,23. At the ends of the receiving 15 the opening 31 flares outwardly to facilitate the insertion of fibers.

The sections 27,29 are held in opposed assembled relationship by sleeve 13. Preferably the receiving member 15 has an exterior shape in the form of an equal sided polygon with the corners of the polygon abutting the inside surface of the sleeve. Due to the elasticity of the receiving member 15, it may be forced into the sleeve 13. To firmly hold the sleeve 13 in place, an adhesive may be used.

The glass sleeve 13 is cylindrically shaped having a smooth bore of circular cross section to provide for easy insertion of the receiving member 15. The open ends 17,19 are spaced a sufficient distance from the receiving member 15 to permit accommodation of the fiber guides 20,22. The sleeve 13 is substantially symmetrical about the straight axis with end surfaces lying in a plane normal to the straight axis. The sleeve 13 may be manufactured as a glass tube by techniques known in the art with the ends cut to give a tube of appropriate length.

Each of the fiber guides 20,22 are pluggable inserted into and retained in a respective end 17,19 of the sleeve 13. Interior the sleeve 13, the distance between the fiber receiving member 15 and the interior end of respective guides 20,22 should not be so great as to cause fiber buckling during fiber insertion but should permit the insertion force to be sustained along the straight axis 25.

The following description is provided with respect to fiber guide 20. Since the other fiber guide 22 is of similar construction, a detailed description of fiber guide 22 is not believed necessary. Fiber guide 20 which is of glass construction has a cylindrically shaped section 33 merging into a conically shaped bulge 35 at one end there of. The fiber guide 20 is substantially symmetrical about an axis which corresponds to the straight axis 25 when the fiber guide 20 is positioned in end 17. A centrally aligned orifice 37 which extends entirely through the fiber guide 20 from one end to the other tapers outwardly to provide an enlarged opening 39 at bulge or bulged end 35. In the cylindrical section 33, the orifice 37 has a circular cross section with a diameter of the circular cross section of a fiber 21 to be inserted therein. Typically the fibers utilized have diameters of about 0.25 to about 0.50 millimeters. The diameter of the orifice 37 should be sufficiently small to provide support to the fiber to assure axial alignment but sufficiently large to permit ease of fiber insertion. The orifice 37 should have a smooth internal bore to prevent marring of the fiber.

The fiber guide 20 is fixedly mounted in a open end 17 with the outer surface of the cylindrically shaped section 33 adjacent the inner surface of the sleeve 13. The fiber guide 20 is coaxially aligned with the sleeve 13 so that respective surfaces of the sleeve and cylindrically shaped section are substantially concentric. The outer surface of the conical bulging section 35 abuts the end 17 to prevent inward movement of the fiber guide toward the receiving member 15. Outward movement is prevented by securing the guide 20 with an adhesive. The bulging section 35 projects exterior the sleeve 13 for receiving a fiber.

The fiber guide 20 preferably has a coefficient of expansion matching that of the sleeve and the fiber 20 and is most preferably quartz. Thus, when the connector 11 is assembled, the micro stresses caused by connector parts having different coefficients of expansion then the fibers are substantially lessened.

To assemble the connector 11, the receiving member 15 is loaded into the sleeve 13 at a central position. The other guides 20,22 with outside surface of the cylindrical section 33 coated with an adhesive is inserted into the respective ends 17,19. After the adhesive sets, fibers, 21,23 are inserted into the fiber guides 20,22 and urged inwardly until the fibers 21,23 abut in end-to-end relationship at the fiber receiving member 15. The fibers 21,23 may be coated with an adhesive to secure the fibers 21,23.

INDUSTRIAL APPLICABILITY

The connector for the present invention is useful for connecting optical fibers to a receiving member for the transmission of optical signals from one fiber to another.

I claim:

1. A connector for joining a pair of optical fibers in end-to-end relationship along a straight axis comprising an elastomeric fiber receiving member having an opening for expandably receiving an optical fiber dimensioned larger than said opening, a cylindrically shaped glass sleeve mounted about said fiber receiving member having open ends spaced from said receiving member, a pair of glass fiber guides, each guide having a cylindrically shaped section and a conically shaped bulge at one end thereof with a centrally aligned orifice extending there through, said orifice tapering outwardly to provide an enlarged opening at said one end, each fiber guide being fixedly mounted in a respective open end with the outer surface of each cylindrically shaped section adjacent the inner surface of each sleeve with the outer surface of each conically shaped bulge abuting a respective open end, said respective orifice being aligned along said straight axis for guiding a respective optical fiber along said straight axis for abuting a pair of fibers in end-to-end relationship in said fiber receiving member.

2. A connector according to claim 1 wherein said glass sleeve and said glass fiber guides have a coefficient of expansion substantially similar to fibers which are abuted therein.

3. A connector according to claim 1 wherein said glass sleeve and said glass fiber guides consist essentially of quartz.

4. A connector according to claim 1 wherein said centrally aligned orifice has a circular cross section with a diameter slightly large than the diameter of said fibers to be mated to permit movement of fibers through respective orifices.

5. A connector according to claim 1 wherein said fiber receiving member and said fiber guiding members are fixedly mounted to said sleeve.

* * * * *